(12) United States Patent
Feng

(10) Patent No.: US 11,959,584 B2
(45) Date of Patent: Apr. 16, 2024

(54) SMOOTHLY ADJUSTABLE DISPLAY SCREEN BRACKET

(71) Applicant: DongGuan KINGEASY Hardware Technology CO., LTD, Dongguan (CN)

(72) Inventor: Bo Feng, Dongguan (CN)

(73) Assignee: DongGuan KINGEASY Hardware Technology CO., LTD, Dongguan (CN)

( * ) Notice: Subject to any disclaimer, the term of this patent is extended or adjusted under 35 U.S.C. 154(b) by 169 days.

(21) Appl. No.: 17/719,449

(22) Filed: Apr. 13, 2022

(65) Prior Publication Data
US 2023/0296202 A1 Sep. 21, 2023

(30) Foreign Application Priority Data
Mar. 18, 2022 (CN) .......................... 202210272212.X

(51) Int. Cl.
*F16M 11/10* (2006.01)
*F16M 11/20* (2006.01)

(52) U.S. Cl.
CPC .......... *F16M 11/10* (2013.01); *F16M 11/2014* (2013.01)

(58) Field of Classification Search
CPC ...... F16M 11/046; F16M 11/10; F16M 11/12; F16M 11/121; F16M 11/123; F16M 11/125; F16M 11/126; F16M 11/128; F16M 11/2014
See application file for complete search history.

(56) References Cited

U.S. PATENT DOCUMENTS

| | | | | |
|---|---|---|---|---|
| 7,207,537 B2* | 4/2007 | Hung | ..................... | F16M 13/02 248/920 |
| 7,510,155 B2* | 3/2009 | Huang | ............... | F16M 11/2014 248/278.1 |
| 7,810,773 B2* | 10/2010 | Chi | ......... | F16M 11/24 248/920 |
| 8,011,632 B2* | 9/2011 | Wang | ..................... | F16M 11/10 248/920 |
| 8,070,114 B2* | 12/2011 | Chen | .................. | F16M 11/2021 248/278.1 |

(Continued)

FOREIGN PATENT DOCUMENTS

WO WO-2009088139 A1 * 7/2009 ............. B23K 11/11

*Primary Examiner* — Eret C McNichols
(74) *Attorney, Agent, or Firm* — Jeenam Park

(57) ABSTRACT

A smoothly adjustable display screen bracket comprises: a first connecting seat, a connecting rod group and a second connecting seat, wherein the connecting rod group is arranged between the first connecting seat and the second connecting seat, the connecting rod group comprises a connecting rod, a force applying mechanism, a limiting sleeve, a cam member and a roller, and the roller is rotatably arranged on the second connecting seat, and one end of the force applying mechanism is connected with the first connecting seat, and the other end of the force applying mechanism is connected with the cam member, wherein a curved surface of the cam member is configured to press against the roller under the pushing action of the force applying mechanism. The limiting sleeve covers the outside of the force applying mechanism.

9 Claims, 6 Drawing Sheets

(56) References Cited

U.S. PATENT DOCUMENTS

| | | | | |
|---|---|---|---|---|
| 8,960,632 | B2* | 2/2015 | Fallows | F16M 11/2092 |
| | | | | 248/575 |
| 9,004,431 | B2* | 4/2015 | Huang | F16M 11/24 |
| | | | | 248/282.1 |
| 9,027,894 | B2* | 5/2015 | Sapper | F16M 11/08 |
| | | | | 248/921 |
| 9,033,292 | B2* | 5/2015 | Lu | F16M 11/12 |
| | | | | 248/51 |
| 9,228,696 | B2* | 1/2016 | Borloz | F16M 11/046 |
| 10,274,131 | B2* | 4/2019 | Petts | F16M 11/10 |
| 10,309,578 | B2* | 6/2019 | Yen | F16M 11/041 |
| 10,317,058 | B2* | 6/2019 | Hung | F16M 11/048 |
| 10,480,709 | B1* | 11/2019 | Chumakov | F16M 11/10 |
| 10,767,809 | B2* | 9/2020 | Lau | H05K 5/0204 |
| 10,801,660 | B1* | 10/2020 | Liu | F16M 11/08 |
| 11,717,081 | B1* | 8/2023 | Feng | A47B 27/14 |
| | | | | 108/1 |
| 2007/0001076 | A1* | 1/2007 | Asamarai | F16M 11/2092 |
| | | | | 248/281.11 |
| 2012/0267497 | A1* | 10/2012 | Bowman | F16M 13/022 |
| | | | | 248/280.11 |
| 2018/0112820 | A1* | 4/2018 | Lau | F16M 11/2092 |
| 2018/0209582 | A1* | 7/2018 | Petts | F16M 13/022 |
| 2019/0219220 | A1* | 7/2019 | Chou | F16M 11/24 |
| 2022/0390061 | A1* | 12/2022 | You | F16M 13/02 |
| 2023/0010833 | A1* | 1/2023 | Fei | F16M 11/041 |
| 2023/0288023 | A1* | 9/2023 | Barros | F16M 11/08 |
| | | | | 248/278.1 |

* cited by examiner

SMOOTHLY ADJUSTABLE DISPLAY SCREEN BRACKET

CROSS-REFERENCE TO RELATED APPLICATIONS

This application claims the benefit and priority of Chinese patent application No. 202210272212.X, filed on Mar. 18, 2022, disclosure of which is hereby incorporated by reference in its entirety.

TECHNICAL FIELD

The present application relates to the technical field of electronic video screen product support devices, and in particular, to a smoothly adjustable display screen bracket.

BACKGROUND

In recent years, with the continuous development of society and the continuous progress of scientific level, the production technology of electronic products has progressed faster and faster, and the frequency of replacement of electronic products has become faster and faster. For example, the development of TV sets has developed from black and white TV sets to color TV sets, and from desktop TV sets to today's LCD flat-panel TV sets and computers, which has greatly enriched people's cultural life and improved people's living standards. Electronic products such as flat-panel TVs and tablet computers have the advantages of light weight and small footprint, which are convenient for people to watch and use. People generally use movable supports to fix such electronic products on desks or walls for use.

At present, an existing patent named "movable support frame" and patent number CN201420151704.4 proposes a technical solution. In this technical solution, the curved surface of the cam is urged to abut against the roller on the fixing seat by providing a thrust force through the force-applying mechanism. The roller will give a supporting force to the cam member, and its supporting force F will form an oblique upward action component F1 on the curved surface. The action component F1 is transmitted to the connecting seat through the force applying mechanism and the connecting rod, so that the connecting seat can carry objects with a certain weight, such as a monitor or a TV screen, etc. When the weight T of the loaded object is the same as the acting component F1, the loaded object can stay in a certain position. Furthermore, since its acting component F1 at any position on the curved surface of the cam member is equal, the loaded object carried on the connecting base can be adjusted to stay at any height position, which brings stepless adjustment in use. The adjustment effect is convenient and random.

However, this technical solution still has defects. When adjusting the position, there is still insufficient coordination between the force applying mechanism, the curved surface of the cam member and the roller, and the spring of the force applying mechanism is easy to sway during adjustment. As a result, the adjustment of the movable support frame is not smooth enough.

Therefore, there is an urgent need on the market for a smoothly adjustable display screen bracket to solve this problem.

SUMMARY

In view of the deficiencies in the prior art, the present application proposes a smoothly adjustable display screen bracket. In this application, a force applying mechanism is newly added, which can prevent the connecting rod group from being unstable in adjustment and difficult to move during adjustment, and has strong practicability.

To achieve the above object, the present application adopts the following technical solution:

A smoothly adjustable display screen bracket, comprising: a first connecting seat, a connecting rod group and a second connecting seat, and the connecting rod group is arranged between the first connecting seat and the second connecting seat, wherein the connecting rod group comprises a connecting rod, a force applying mechanism, a limiting sleeve, a cam member and a roller, and the roller is rotatably arranged on the second connecting seat, and one end of the force applying mechanism is connected with the first connecting seat, and the other end of the force applying mechanism is connected with the cam member, wherein a curved surface of the cam member is configured to press against the roller under the pushing action of the force applying mechanism and the limiting sleeve is configured to cover the outside of the force applying mechanism.

As a further elaboration on the above technical solutions:

In the above technical solution, the force applying mechanism comprises a pressure spring, and one end of the pressure spring abuts against the cam member.

In the above technical solution, the force applying mechanism further comprises a hanging plate, an adjusting screw and an adjusting moving block, and one end of the hanging plate is configured to pivotally connect with the first connecting seat, the adjusting screw is configured to clamp with the hanging plate by screw head, the adjusting moving block is configured to screw on the adjusting screw, the pressure spring is configured to sleeve on the outside of the adjusting screw and both ends of the pressure spring are configured to abut between the adjusting moving block and the cam member, the limiting sleeve is configured to cover the outside of the pressure spring.

In the above technical solution, the limiting sleeve comprises a flexible sleeve, the inner diameter of the flexible sleeve is configured to adapt to the outer diameter of the pressure spring, and the flexible sleeve is configured to cover the outside of the pressure spring.

In the above technical solution, the limiting sleeve comprises a rigid sleeve, the inner diameter of the rigid sleeve is configured to adapt to the outer diameter of the pressure spring, and the rigid sleeve is configured to cover the outside of the pressure spring.

In the above technical solution, the limiting sleeve comprises a flexible sleeve and a rigid sleeve, the inner diameter of the flexible sleeve is configured to adapt to the outer diameter of the pressure spring, and the inner diameter of the rigid sleeve is configured to adapt to the outer diameter of the flexible sleeve, and the flexible sleeve is configured to cover the outside of the pressure spring, and the rigid sleeve is configured to cover the outside of the flexible sleeve.

In the above technical solution, the connecting rod comprises a first connecting rod and a second connecting rod, and the second connecting rod is configured to cover with the upper end of the first connecting rod, and one end of the first connecting rod is configured to pivotally connected with the first connecting seat, the other end of the first connecting rod is configured to pivotally connect with the second connecting seat, one end of the second connecting rod is configured to pivotally connect with the first connecting seat, and the other end of the second connecting rod is configured to pivotally connect with the second connecting seat, the rigid sleeve is configured to fix to the second connecting rod by screws.

In the above technical solution, a cam sleeve adapted to the cam member is provided on the second connecting rod, wherein the cam member is configured to slidably arrange at the cam sleeve, and the cam sleeve is configured to fix at the second connecting rod by screws.

In the above technical solution, the roller is located at the front position between the pivot joints of the first connecting rod, the second connecting rod and the second connecting seat.

In the above technical solution, further comprising a mounting seat, a connecting bracket and a fixing seat.

Compared with the prior art, the present application has obvious advantages and beneficial effects. Specifically, its structure is novel and the design is reasonable. By using the newly added limiting sleeve and cam sleeve, and canceling the center rod, the flexible sleeve wraps the pressure spring, and the rigid sleeve further limits it to prevent the pressure spring from swinging during adjustment. Therefore, the adjustment of the connecting rod group can be effectively prevented from being unstable, not easy to move, and the movement is not smooth enough, and it can bring about a stepless adjustment effect in use adjustment, and the adjustment is convenient and random, and has strong practicability.

In order to more clearly illustrate the structural features, technical means and the specific purposes and functions achieved by the present application, the present application will be described in further detail below in conjunction with the accompanying drawings and specific embodiments:

DETAILED DESCRIPTION

Figure 1:
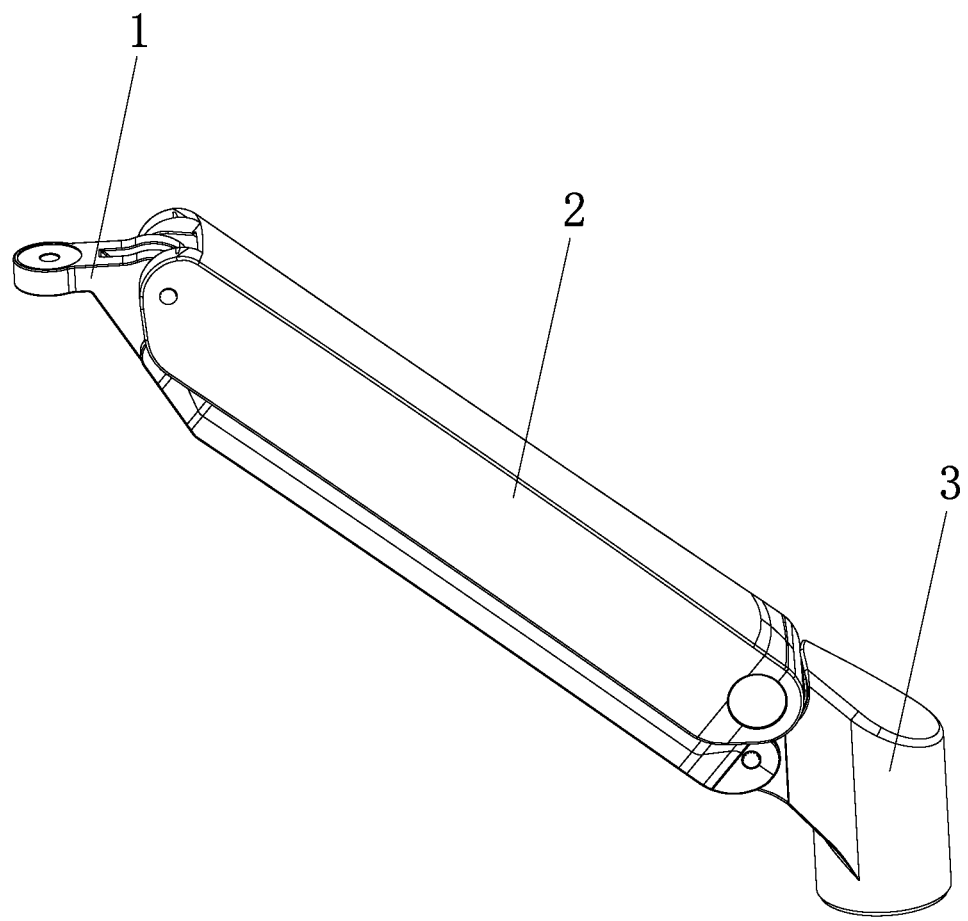
FIG. 1 is a schematic structural diagram of the present application.

In the description of the present application, it should be noted that the terms "center", "upper", "lower", "left", "right", "vertical", "horizontal", "inner", "outer", etc. which are used to indicate position or positional relationship are based on the position or positional relationship shown in the drawings, and are only for the convenience of describing the application and simplifying the description, rather than indicating or implying that the indicated position or element must have a specific orientation and be constructed in a specific orientation and operation, therefore cannot be understood as a limitation of the present application.

In the description of the present application, it should be noted that unless otherwise clearly specified and limited, the terms "installation", and "connection" should be understood in a broad sense, for example, it can be a fixed connection or a detachable connection, or integrally connected; it can be a mechanical connection or an electrical connection; it can be directly connected, or indirectly connected through an intermediate medium, and it can be the internal communication between two components. For those skilled in the art, the specific meaning of the above-mentioned terms in the present application can be understood according to the specific circumstances.

Embodiment 1

Figure 2:
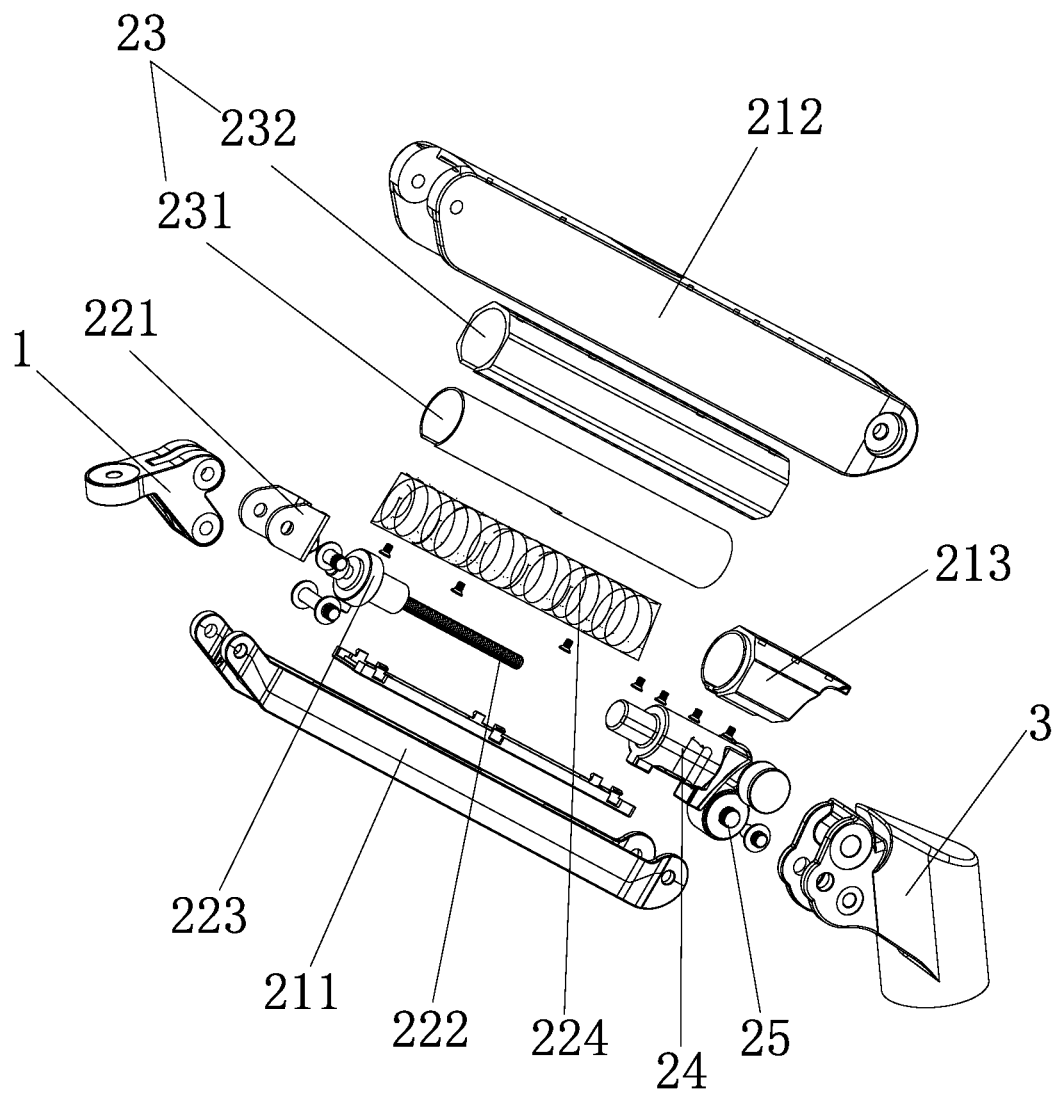
FIG. 2 is an exploded diagram of the present application.
Figure 3:
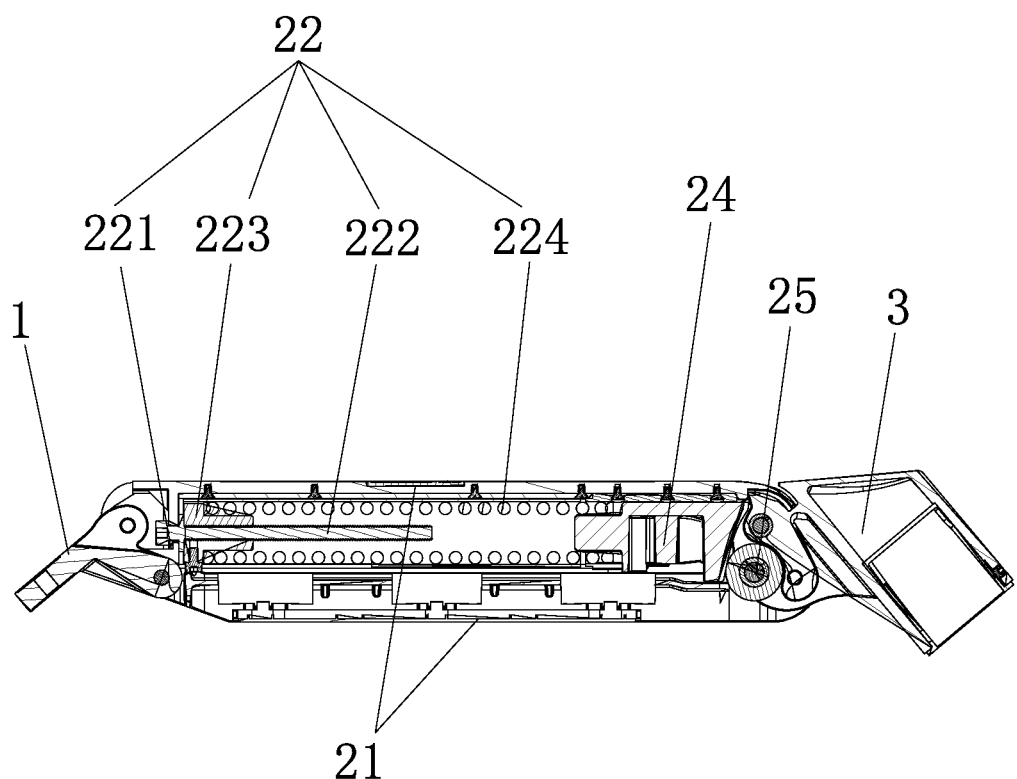
FIG. 3 is a sectional diagram of the present application.
Figure 4:
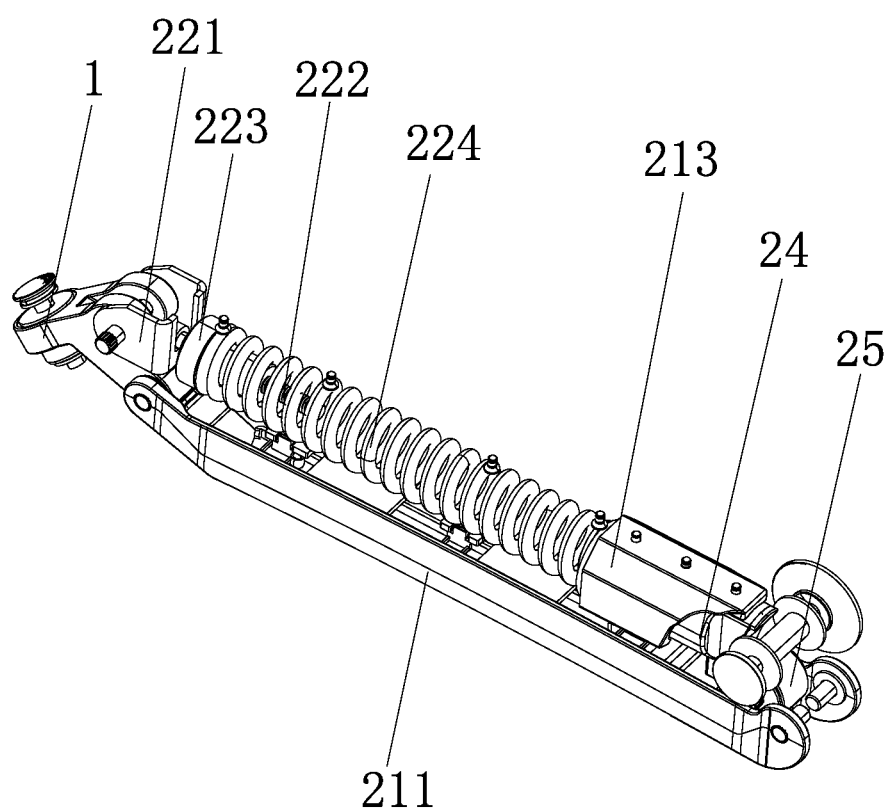
FIG. 4 is an internal partial schematic structural diagram of the present application.
Figure 5:
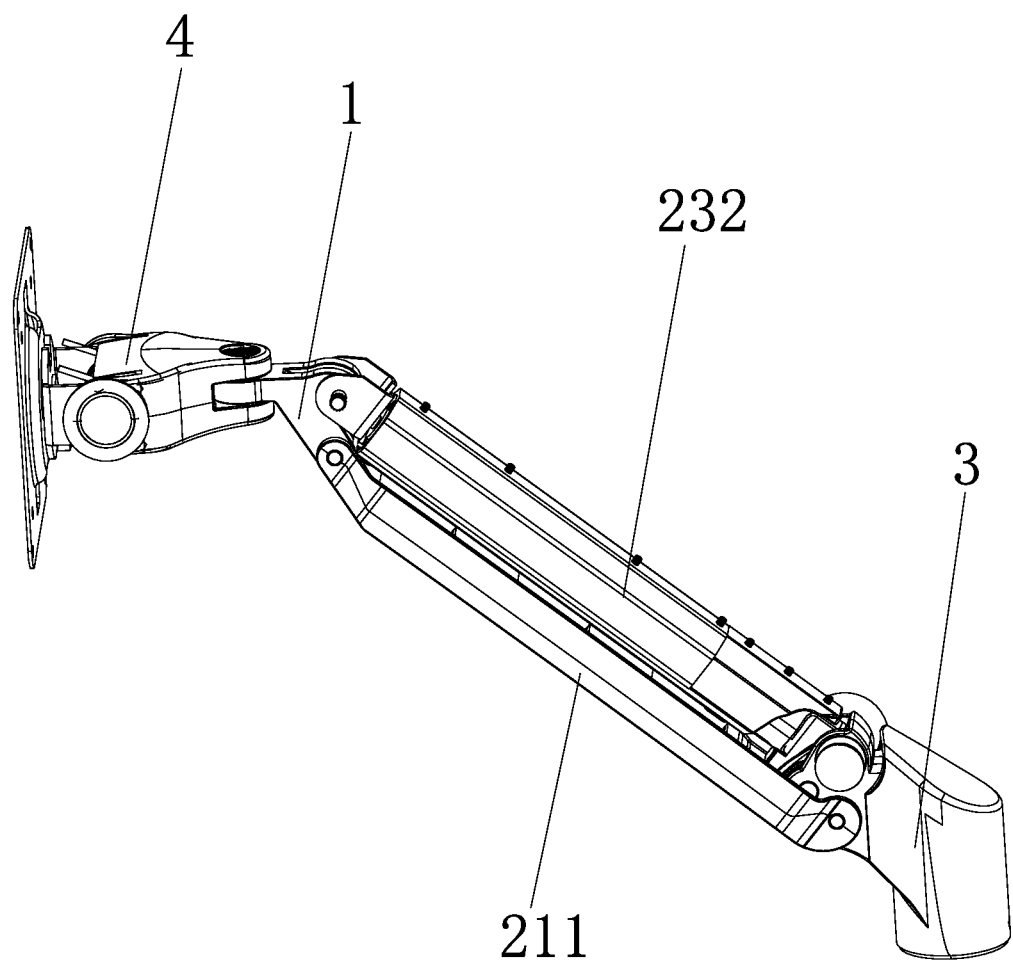
FIG. 5 is a schematic diagram of the present application and the mounting seat.
Figure 6:
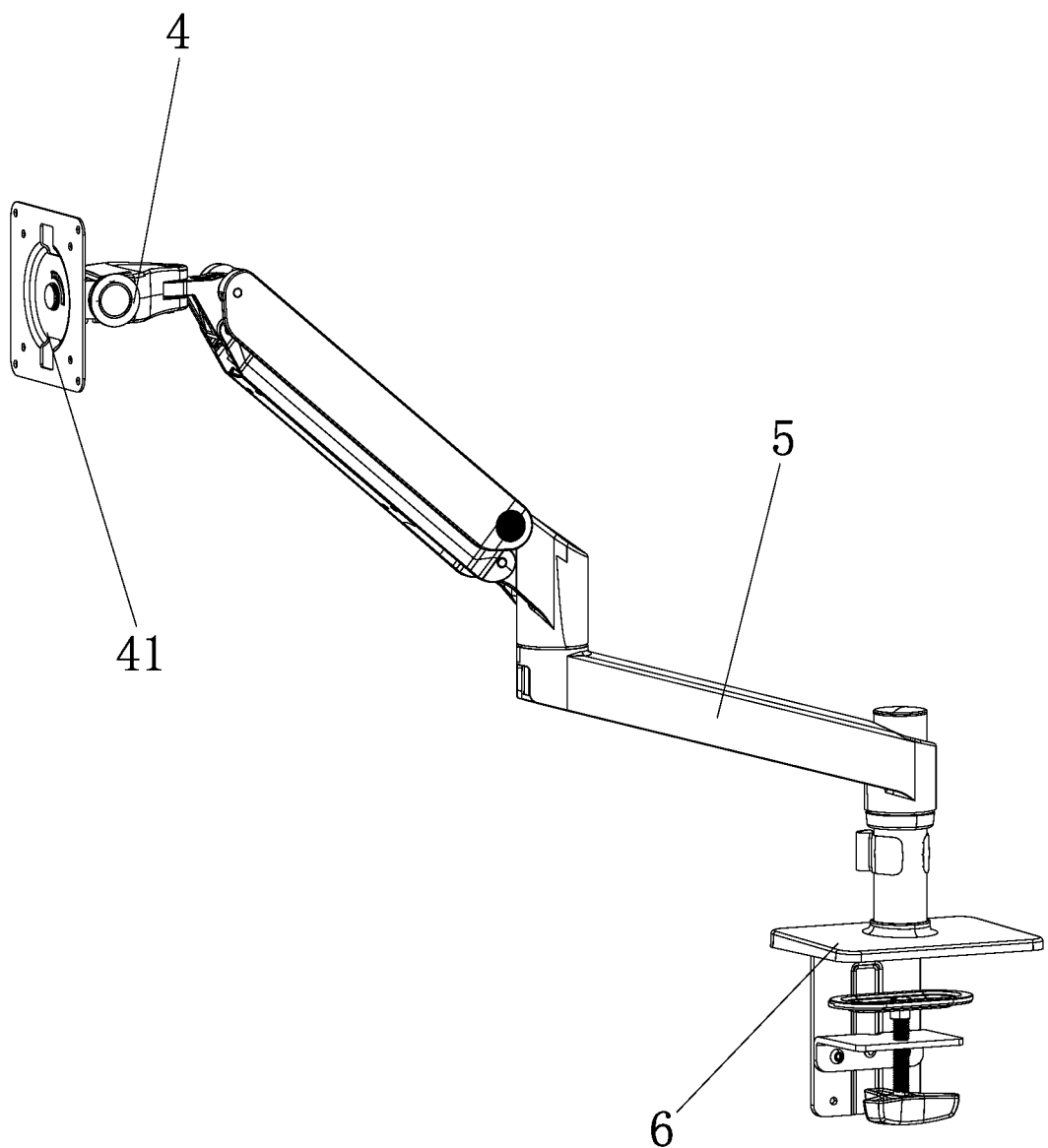
FIG. 6 is a schematic diagram of the present application, the mounting seat and the fixing seat.

As shown in FIGS. 1-6, a smoothly adjustable display screen bracket, comprising: a first connecting seat 1, a connecting rod group 2 and a second connecting seat 3, and the connecting rod group 2 is arranged between the first connecting seat 1 and the second connecting seat 3, wherein the connecting rod group 2 comprises a connecting rod 21, a force applying mechanism 22, a limiting sleeve 23, a cam member 24 and a roller 25, and the roller 25 is rotatably arranged on the second connecting seat, and one end of the force applying mechanism 22 is connected with the first connecting seat 1, and the other end of the force applying mechanism 22 is connected with the cam member 24, wherein a curved surface of the cam member 24 is configured to press against the roller 25 under the pushing action of the force applying mechanism 22 and the limiting sleeve 22 is configured to cover the outside of the force applying mechanism 22.

As a further improvement of the present application, the force applying mechanism 22 comprises a pressure spring 224, and one end of the pressure spring 224 abuts against the cam member 24.

As a further improvement of the present application, the force applying mechanism 22 further comprises a hanging plate 221, an adjusting screw 222 and an adjusting moving block 223, and one end of the hanging plate 221 is configured to pivotally connect with the first connecting seat 1, the adjusting screw 222 is configured to clamp with the hanging plate 221 by screw head, the adjusting moving block 223 is configured to screw on the adjusting screw 222, the pressure spring 224 is configured to sleeve on the outside of the adjusting screw 222 and both ends of the pressure spring are configured to abut between the adjusting moving block 223 and the cam member 24, the limiting sleeve 23 is configured to cover the outside of the pressure spring 224.

As a further improvement of the present application, the limiting sleeve 23 comprises a flexible sleeve 231, the inner diameter of the flexible sleeve 231 is configured to adapt to the outer diameter of the pressure spring 224, and the flexible sleeve 231 is configured to cover the outside of the pressure spring 224.

As a further improvement of the present application, the connecting rod 21 comprises a first connecting rod 211 and a second connecting rod 212, and the second connecting rod 212 is configured to cover with the upper end of the first connecting rod 211, and one end of the first connecting rod 211 is configured to pivotally connected with the first connecting seat 1, the other end of the first connecting rod 211 is configured to pivotally connect with the second connecting seat 3, one end of the second connecting rod 212 is configured to pivotally connect with the first connecting seat 1, and the other end of the second connecting rod 212 is configured to pivotally connect with the second connecting seat 3, the rigid sleeve 232 is configured to fix to the second connecting rod by screws.

As a further improvement of the present application, a cam sleeve 213 adapted to the cam member 24 is provided on the second connecting rod 212, wherein the cam member 24 is configured to slidably arrange at the cam sleeve 213.

As a further improvement of the present application, the roller 25 is located at the front position between the pivot joints of the first connecting rod 211, the second connecting rod 212 and the second connecting seat 3.

As a further improvement of the present application, further comprising a mounting seat 4. The mounting seat 4 is rotatably connected to the first connecting seat 1 through a rotating shaft. The mounting seat 4 is provided with a mounting plate 41, which is used to install the display screen. A torsion spring is arranged between the mounting plate 41 and the mounting seat 4, and the mounting plate 41 is rotatably arranged on the mounting seat 4 by the torsion spring.

As a further improvement of the present application, further comprising a connecting bracket 5. Both ends of the connecting bracket 5 are provided with shaft receiving holes, and the second connecting seat 3 is rotatably connected to the rotating shaft receiving hole on one side of the connecting bracket 5 through the rotating shaft.

As a further improvement of the present application, further comprising a fixing seat 6. The fixing seat 6 is rotatably connected with the first connecting seat 1 or the shaft receiving hole on the other side of the connecting bracket 5 through the rotating shaft. A first fixing plate is arranged on the fixing seat 6, and a vertical plate is arranged below the first fixing plate. An L-shaped fixing plate is arranged on the vertical plate, and a screw rod is arranged on the L-shaped fixing plate. The end of the screw rod close to the first fixing plate is provided with a second fixing plate, the end of the screw rod away from the first fixing plate is provided with an operating head. The lower surface of the first fixing plate is provided with a backing plate matched with the fixing plate.

The mounting seat 4, the connecting bracket 5 and the fixing seat 6 can be implemented independently with the present application, and the mounting seat 4, the connecting bracket 5 and the fixing seat 6 can also be combined and implemented together with the present application.

Embodiment 2

The difference between this embodiment and Embodiment 1 is that the limiting sleeve 23 comprises a rigid sleeve 232, the inner diameter of the rigid sleeve 232 is configured to adapt to the outer diameter of the pressure spring 224, and the rigid sleeve 232 is configured to cover the outside of the pressure spring 224.

Embodiment 3

The difference between this embodiment and Embodiment 1 and 2 is that the limiting sleeve 23 comprises a flexible sleeve 231 and a rigid sleeve 232, the inner diameter of the flexible sleeve 231 is configured to adapt to the outer diameter of the pressure spring 224, and the inner diameter of the rigid sleeve 232 is configured to adapt to the outer diameter of the flexible sleeve 231, and the flexible sleeve 231 is configured to cover the outside of the pressure spring 224, and the rigid sleeve 232 is configured to cover the outside of the flexible sleeve 231.

The above are only the preferred embodiments of the present application, and are not intended to limit the present application. Therefore, any modification, equivalent replacement, improvement, etc. made to the above embodiments according to the technical practice of the present application still fall within the scope of the technical solution of the present application.

What is claimed is:

1. A smoothly adjustable display screen bracket, comprising: a first connecting seat, a connecting rod group and a second connecting seat, and the connecting rod group is arranged between the first connecting seat and the second connecting seat, wherein the connecting rod group comprises a connecting rod, a force applying mechanism, a limiting sleeve, a cam member and a roller, and the roller is rotatably arranged on the second connecting seat, and one end of the force applying mechanism is connected with the first connecting seat, and the other end of the force applying mechanism is connected with the cam member, wherein a curved surface of the cam member is configured to press against the roller under the pushing action of the force applying mechanism and the limiting sleeve is configured to cover the outside of the force applying mechanism, wherein the force applying mechanism comprises a pressure spring, and one end of the pressure spring abuts against the cam member, wherein the force applying mechanism further comprises a hanging plate, an adjusting screw and an adjusting moving block, and one end of the hanging plate is configured to pivotally connect with the first connecting seat, the adjusting screw is configured to clamp with the hanging plate by screw head, the adjusting moving block is configured to screw on the adjusting screw, the pressure spring is configured to sleeve on the outside of the adjusting screw and both ends of the pressure spring are configured to abut between the adjusting moving block and the cam member, the limiting sleeve is configured to cover the outside of the pressure spring, wherein the limiting sleeve comprises a rigid sleeve, the inner diameter of the rigid sleeve is configured to adapt to the outer diameter of the pressure spring, and the rigid sleeve is configured to cover the outside of the pressure spring, wherein the connecting rod comprises a first connecting rod and a second connecting rod, and the second connecting rod is configured to cover with the upper end of the first connecting rod, and one end of the first connecting rod is configured to pivotally connected with the first connecting seat, the other end of the first connecting rod is configured to pivotally connect with the second connecting seat, one end of the second connecting rod is configured to pivotally connect with the first connecting seat, and the other end of the second connecting rod is configured to pivotally connect with the second connecting seat, the rigid sleeve is configured to fix to the second connecting rod by screws.

2. The smoothly adjustable display screen bracket according to claim 1, wherein the limiting sleeve comprises a flexible sleeve, the inner diameter of the flexible sleeve is configured to adapt to the outer diameter of the pressure spring, and the flexible sleeve is configured to cover the outside of the pressure spring.

3. The smoothly adjustable display screen bracket according to claim 1, wherein the limiting sleeve comprises a flexible sleeve and a rigid sleeve, the inner diameter of the flexible sleeve is configured to adapt to the outer diameter of the pressure spring, and the inner diameter of the rigid sleeve is configured to adapt to the outer diameter of the flexible sleeve, and the flexible sleeve is configured to cover the outside of the pressure spring, and the rigid sleeve is configured to cover the outside of the flexible sleeve.

4. The smoothly adjustable display screen bracket according to claim 3, wherein the connecting rod comprises a first connecting rod and a second connecting rod, and the second connecting rod is configured to cover with the upper end of the first connecting rod, and one end of the first connecting rod is configured to pivotally connected with the first connecting seat, the other end of the first connecting rod is configured to pivotally connect with the second connecting seat, one end of the second connecting rod is configured to pivotally connect with the first connecting seat, and the other end of the second connecting rod is configured to pivotally connect with the second connecting seat, the rigid sleeve is configured to fix to the second connecting rod by screws.

5. The smoothly adjustable display screen bracket according to claim 4, wherein a cam sleeve adapted to the cam member is provided on the second connecting rod, wherein the cam member is configured to slidably arrange at the cam sleeve, and the cam sleeve is configured to fix at the second connecting rod by screws.

6. The smoothly adjustable display screen bracket according to claim 4, wherein the roller is located at the front position between the pivot joints of the first connecting rod, the second connecting rod and the second connecting seat.

7. The smoothly adjustable display screen bracket according to claim 1, wherein a cam sleeve adapted to the cam member is provided on the second connecting rod, wherein the cam member is configured to slidably arrange at the cam sleeve, and the cam sleeve is configured to fix at the second connecting rod by screws.

8. The smoothly adjustable display screen bracket according to claim 1, wherein the roller is located at the front position between the pivot joints of the first connecting rod, the second connecting rod and the second connecting seat.

9. The smoothly adjustable display screen bracket according to claim 1, wherein further comprising a mounting seat, a connecting bracket and a fixing seat.

* * * * *